United States Patent
Terada et al.

(10) Patent No.: US 8,098,850 B2
(45) Date of Patent: Jan. 17, 2012

(54) DIGITAL MIXER

(75) Inventors: Kotaro Terada, Hamamatsu (JP); Hiroaki Fujita, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 694 days.

(21) Appl. No.: 12/178,010

(22) Filed: Jul. 23, 2008

(65) Prior Publication Data

US 2009/0028359 A1 Jan. 29, 2009

(30) Foreign Application Priority Data

Jul. 23, 2007 (JP) ................. 2007-190381

(51) Int. Cl.
*H04B 1/00* (2006.01)
(52) U.S. Cl. .......................... 381/119; 700/94
(58) Field of Classification Search .................. 381/119; 700/94
See application file for complete search history.

(56) References Cited

U.S. PATENT DOCUMENTS

| 7,499,558 B2 | 3/2009 | Holton |
| 2006/0210098 A1 | 9/2006 | Okabayashi et al. |

FOREIGN PATENT DOCUMENTS

| JP | 2005-086802 A | 3/2005 |
| JP | 2006-262079 | 9/2006 |
| JP | 2007-074359 A | 3/2007 |

OTHER PUBLICATIONS

Yamaha Digital Mixing Console M7CL, Owner's Manual, 2005.
Notification of Reasons for Rejection mailed Jun. 2, 2009, for JP Patent Application No. 2007-190381, with English Translation, 10 pages.

*Primary Examiner* — Douglas Menz
(74) *Attorney, Agent, or Firm* — Morrison & Foerster LLP

(57) ABSTRACT

A digital mixer is capable of assigning a desired parameter to an encoder provided in a channel strip on a panel of the digital mixer. The digital mixer assigns a parameter, which corresponds to one of knob controls having switches operable to be turned on, to each encoder provided in a channel strip section on the panel in response to the operation of the switch of the one knob control provided in a selected channel section. The knob controls with the switches are not graphic symbols displayed on a display screen, but are physically disposed on the panel. Accordingly, it is possible to assign a desired parameter to an encoder with no mistake by operating a desired knob control with a switch to be turned on without a mistake.

3 Claims, 10 Drawing Sheets

FIG.5 (A)

DATA OF EQ
(PARAMETRIC EQUALIZER)

· FOR EACH BAND
  · CENTER FREQUENCY
  · Q
  · GAIN

AND THE LIKE

FIG.5 (B)

DATA OF Dynamics
(COMPRESSOR, GATE)

· TYPE
· THRESHOLD VALUE
· RATE
· ATTACK
· RELEASE

AND THE LIKE

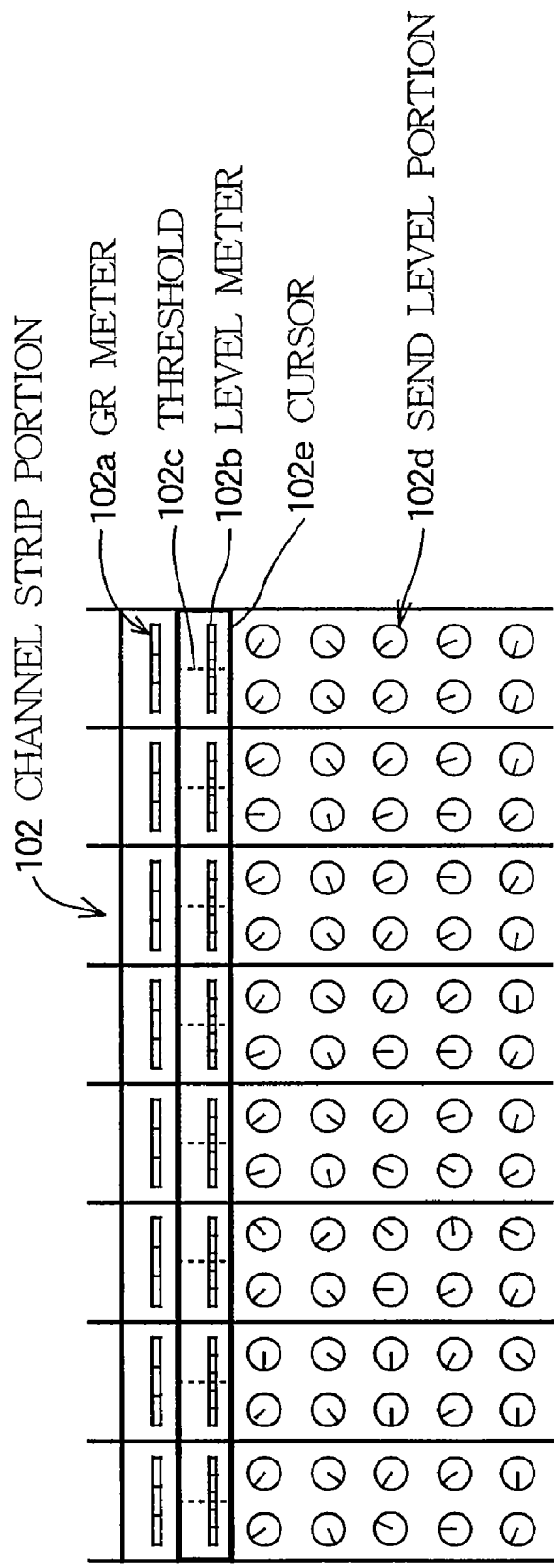

DIGITAL MIXER

BACKGROUND OF THE INVENTION

1. Technical Field

The present invention relates to a digital mixer capable of easily changing a parameter used in performing signal processing on an input signal.

2. Background Art

In the related art, there is known a digital mixer which adjusts levels or frequency characteristics of audio signals output from a plurality of microphones or electrical and electronic instruments, mixes the audio signals, and transmits the mixed audio signals to a power amplifier, and which is used in a concert hall or the like. Such a digital mixer is disclosed, for example, in Japanese patent application laid-open No. 2006-262079. An operator who operates a digital mixer adjusts the sound volume or tone of each audio signal of musical instrument sound or song to an optimum state, which is considered to express the performance most suitably, by operating various kinds of panel controls in the digital mixer. The digital mixer includes a plurality of input channels as an input signal process, a bus which mixes signals output from the input channels, and a plurality of output channels which is an output signal system that outputs mixed signals. Each input channel controls the frequency characteristics, mixing levels, and the like of input signals and outputs the signals to each mixing bus, and each mixing bus mixes the input signals and outputs the mixed signal to the corresponding output channel. An output from the output channel is amplified and is then emitted from a speaker or the like.

In a known digital mixer, various parameters for signal processing are prepared in the input channel and output channel. Each of the parameters may be changed by a user, and a selection channel operating portion for loading and changing a parameter in a selected channel is prepared. In order to change a parameter of a specific channel, a user has changed the parameter by selecting the specific channel and operating a control, such as a knob control, corresponding to the parameter to be changed in the selection channel operating portion. In this case, channel strips for a plurality of channels are prepared on a panel of the digital mixer. A channel assigned to a channel strip whose SEL button is operated last among SEL buttons provided in each channel strip becomes a 'selected channel'. In addition, an encoder operated to rotate is provided in each channel strip. Allocation of a parameter changed by the encoder is performed by a touch operation on a control symbol (graphic control) displayed on an indicator using a touch panel, and a parameter corresponding to a control symbol operated by a touch operation is assigned to an encoder.

However, touch action to the touch panel needs to be performed while viewing control symbols displayed on the indicator, and the control symbols displayed on the indicator are not physically separated controls. Accordingly, there is a problem that a wrong parameter is assigned to the encoder when a neighboring control symbol is inadvertently touched by mistake.

SUMMARY OF THE INVENTION

Therefore, it is an object of the invention to provide a digital mixer capable of assigning a desired parameter to an encoder provided in a channel strip with no mistake.

In order to achieve the above object, a main feature of a digital mixer according to an aspect of the invention is to assign a parameter, which corresponds to a knob control with a switch operated to be turned on, to each encoder provided in a channel strip section in response to an ON operation of any knob control with a switch provided in a selected channel section.

According to the aspect of the invention, a parameter corresponding to a knob control with a switch operated to be turned on is assigned to each encoder provided in the channel strip section in response to an ON operation of any knob control with a switch provided in the selected channel section. In this case, the knob control with a switch is not a graphic symbol displayed on the display screen but is physically disposed on a panel. Accordingly, it is possible to assign a desired parameter to an encoder with no mistake by easily operating a desired control with a switch to be turned on without a mistake.

In a particular configuration, the inventive digital mixer (1), having a panel (FIG. 3), is designed for processing audio signals through a plurality of channels (33) and mixing the processed audio signals. The digital mixer comprises: a display (15, 101) disposed on the panel; a memory (12) that stores parameters of each of the channels; a channel strip section (51) that has a plurality of channel strips (i=1-8), each having a fader (66-$i$), a channel selection button (61-$i$) and an encoder (60-$i$), and that is disposed adjacent to the display (101); a selected channel section (50) that has a plurality of knob controls (50$a$-50$d$) with switches and that is disposed on the panel; a channel assignor (52$a$-52$f$) that assigns the channel strips in the channel strip section to a part of the plurality of the channels; a channel selector (FIG. 8A, S31) that, in response to an operation on the channel selection button in one of the channel strips by a user, selects the channel assigned to the one of the channel strips; a parameter assignor (FIG. 10, S60) that, in response to an operation on the switch of one of the knob controls in the selected channel section by the user, assigns a parameter corresponding to the knob control having the operated switch, to the encoders of the channel strips in the channel strip section; a parameter modifier (FIG. 7B, S20, FIG. 8B, S40 and FIG. 9, S50) that modifies the parameters in the memory in response to operations on the panel by the user; and an audio processor (19) that processes and mixes the audio signals on the basis of the parameters in the memory, wherein in response to an operation on the fader (66-$i$) of one of the channel strips in the channel strip section (51) by the user, the parameter modifier (FIG. 7B, S20) modifies a sound volume parameter of a channel assigned to the one of the channel strips in the memory, wherein in response to a rotation operation on one of the knob controls (50$a$-50$d$) in the selected channel section (50) by the user, the parameter modifier (FIG. 9, S50) modifies a parameter corresponding to the one of the knob controls, in the parameters of the channel selected by the channel selector in the memory, and wherein in response to a rotation operation on the encoder (60-$i$) in one of the channel strips by the user, the parameter modifier (FIG. 8B, S40) modifies a parameter assigned by the parameter assignor, in the parameters of a channel assigned to the one of the channel strips in the memory.

In another particular configuration, the inventive digital mixer (1), having a panel (FIG. 3), is designed for processing audio signals through a plurality of channels (33) and mixing the processed audio signals. The digital mixer comprises: a display (15, 101) disposed on the panel; a memory (12) that stores parameters of each of the channels; a channel strip section (51) that has a plurality of channel strips (i=1-8), each having a fader (66-$i$), a channel selection button (61-$i$) and an encoder (60-$i$), and that is disposed adjacent to the display (101) and in front of the display; a selected channel section (50) that has a plurality of knob controls (50$a$-50$d$) with switches and that is disposed on the panel; a channel assignor (52a-52f) that assigns the channel strips in the channel strip section to a part of the plurality of the channels, and that displays a screen (102) of channel strips having indications of the parameters, continuous with the channel strips in the channel strip section (51), on the display; a channel selector (FIG. 8A, S31) that, in response to an operation on the channel selection button in one of the channel strips by a user, selects the channel assigned to the one of the channel strips; a parameter assignor (FIG. 10, S60 and S61) that, in response to an operation on the switch of one of the knob controls in the selected channel section by the user, assigns a parameter corresponding to the knob control having the operated switch, to the encoders (60) of the channel strips in the channel strip section (51), and sets, for each of the channel strips displayed on the display, a cursor (102e) at one of the indications corresponding to the assigned parameter; a parameter modifier (FIG. 7B, S20, FIG. 8B, S40 and FIG. 9, S50) that modifies the parameters in the memory in response to operations on the panel by the user; and an audio processor (19) that processes and mixes the audio signals on the basis of the parameters in the memory, wherein in response to an operation on the fader (66-i) of one of the channel strips in the channel strip section (51) by the user, the parameter modifier (FIG. 7B, S20) modifies a sound volume parameter of a channel assigned to the one of the channel strips in the memory, wherein in response to a rotation operation on one of the knob controls (50a-50d) in the selected channel section (50) by the user, the parameter modifier (FIG. 9, S50 and S51) modifies a parameter corresponding to the one of the knob controls, in the parameters of the channel selected by the channel selector in the memory and updates the indication of the modified parameter on the display, and wherein in response to a rotation operation on the encoder (60-i) in one of the channel strips by the user, the parameter modifier (FIG. 8B, S40 and S41) modifies a parameter assigned by the parameter assignor, in the parameters of a channel assigned to the one of the channel strips in the memory and updates the indication of the modified parameter on the display.

Preferably, the display is a touch panel (101), wherein in response to the operation on the switch of one of the knob controls provided in the selected channel section, the parameter assignor (FIG. 10, S62 and S63) pop-ups a sub-screen (105), over the screen (102) on the display, continuous with the channel strips in the channel strip section, the pop-upped sub-screen graphically presenting controls of the assigned parameter corresponding to the knob controls of the channel strips and graphic button controls (105b and 105c) of a binary parameter associated to the assigned parameter, and wherein in response to an operation on the graphic button corresponding to one of the channel strips by the user, the parameter modifier modifies an ON/OFF state of the binary parameter of a channel assigned to the one of the channel strips.

BRIEF DESCRIPTION OF THE DRAWINGS

FIGS. 5A and 5B are views illustrating examples of data of an equalizer and data of dynamics according to the embodiment of the invention.

FIG. 13 is a view illustrating another example of a cursor moved in the knob(p) ON operation event processing executed in the digital mixer according to the embodiment of the invention.

DETAILED DESCRIPTION OF THE INVENTION

Figure 1:
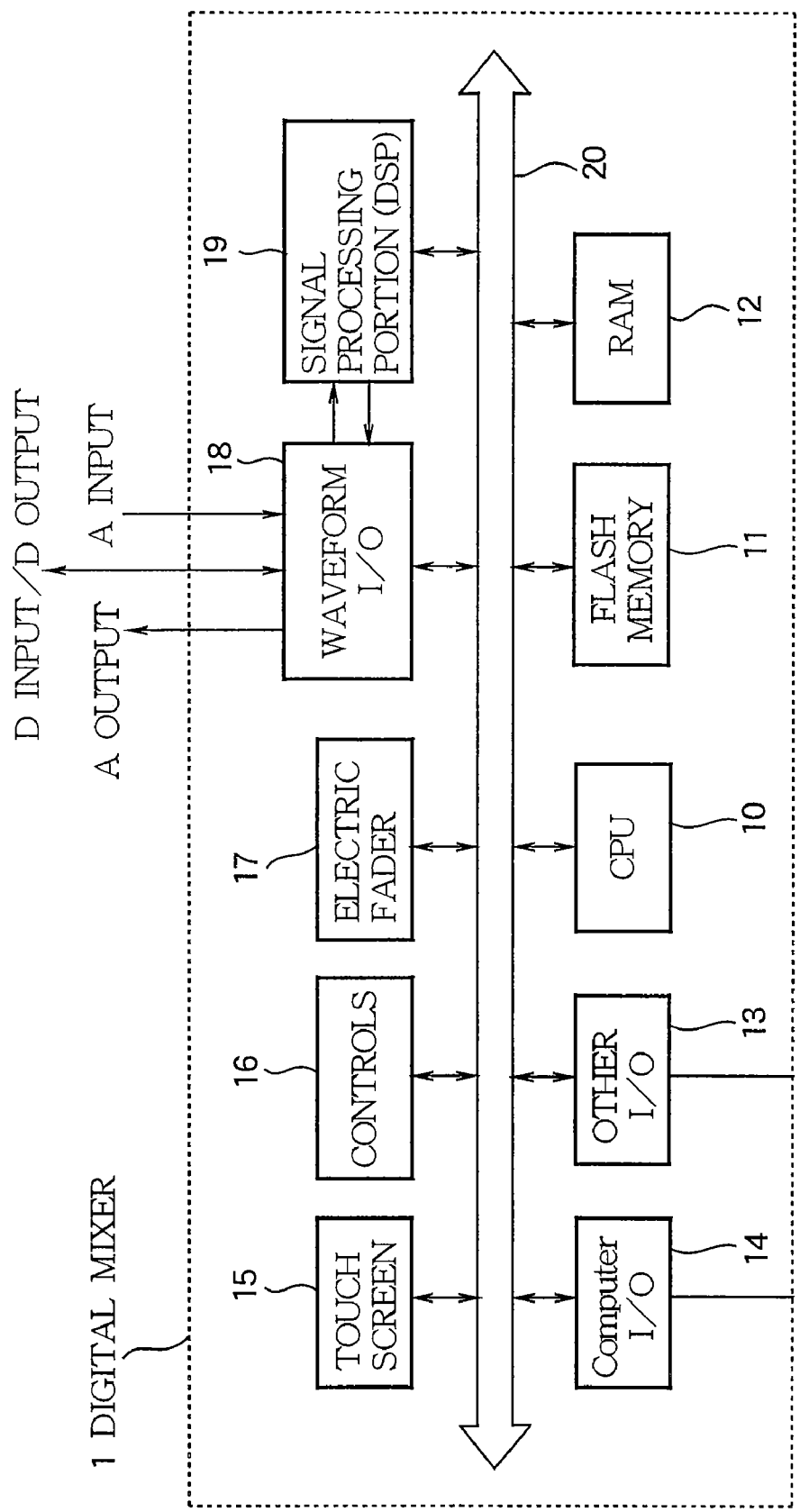
FIG. 1 is a block diagram illustrating the configuration of a digital mixer according to an embodiment of the invention.

A block diagram illustrating the configuration of a digital mixer according to an embodiment of the invention is shown in FIG. 1.

A digital mixer 1 according to an embodiment of the invention shown in FIG. 1 includes: a CPU (central processing unit) 10 which controls the entire operation of the digital mixer 1 and generates a control signal corresponding to an operation of a control, such as a knob control; a nonvolatile rewritable flash memory 11 in which operation software, such as a mixing control program, executed by the CPU 10 is stored; and a RAM (random access memory) 12 in which a work area of the CPU 10, various kinds of data, and the like are stored. Thus, since the operation software is stored in the flash memory 11, the operation software may be upgraded by rewriting the operation software in the flash memory 11. In addition, other apparatuses, such as a digital recorder, are connected to the digital mixer 1 through I/O 13 that is an input/output interface. In addition, a computer connection interface (computer I/O) 14 through which a computer can be connected is provided, and the digital mixer 1 can be remote controlled by the computer by connecting the computer to the computer connection interface 14 and by executing a mixing control program.

A touch screen 15 is provided on a panel of the digital mixer 1. In a display device where a display panel such as a liquid crystal display, and a matrix switch or the like are combined, it is possible to change a parameter value or switch ON/OFF states by performing an operation of pressing the display on the touch screen 15. The touch screen 15 is configured to include a touch panel for selecting a channel group which includes a plurality of channels, and another touch panel on which a screen of a channel strip portion for a plurality of channels or a screen of controls that can change parameter of channels is displayed. Controls 16 are a knob control for changing a parameter of a selected channel, and a control provided in a channel strip. An electric fader 17 is a fader which adjusts the level of a signal of an input channel or a signal of an output channel, and the level adjustment can be made manually or electrically. All inputs and all outputs of the digital mixer 1 are performed by a waveform I/O (waveform data interface) 18. The waveform I/O 18 includes a plurality of A input ports to which analog signals are input, a plurality of A output ports from which analog signals are output, and a plurality of bidirectional D input/D output ports to which digital signals from the outside are input and from which the digital signals are output to the outside.

In addition, the waveform I/O 18 also includes a monitor port for outputting a monitor signal when an operator of the digital mixer 1 operates a control. Furthermore, a signal processing portion (DSP) 19 is formed by a plurality of DSPs (digital signal processors) and performs mixing processing, effect application processing, and the like under the control of the CPU 10. The RAM 12 stores current values of various parameters for controlling the mixing processing or the effect processing. The CPU 10 changes the current values of the parameters stored in the RAM 12 according to the operation of a control, such as a knob, and controls a coefficient or algorithm of the mixing processing or the effect processing performed by the signal processing portion 19 on the basis of the current values of the parameters. A mixed signal obtained by performing the mixing processing in the signal processing portion 19 may be supplied to a recorder so as to be recorded, and a mixed signal reproduced from the recorder may be supplied to the signal processing portion 19. Each portion is connected to a bus 20.

Figure 2:
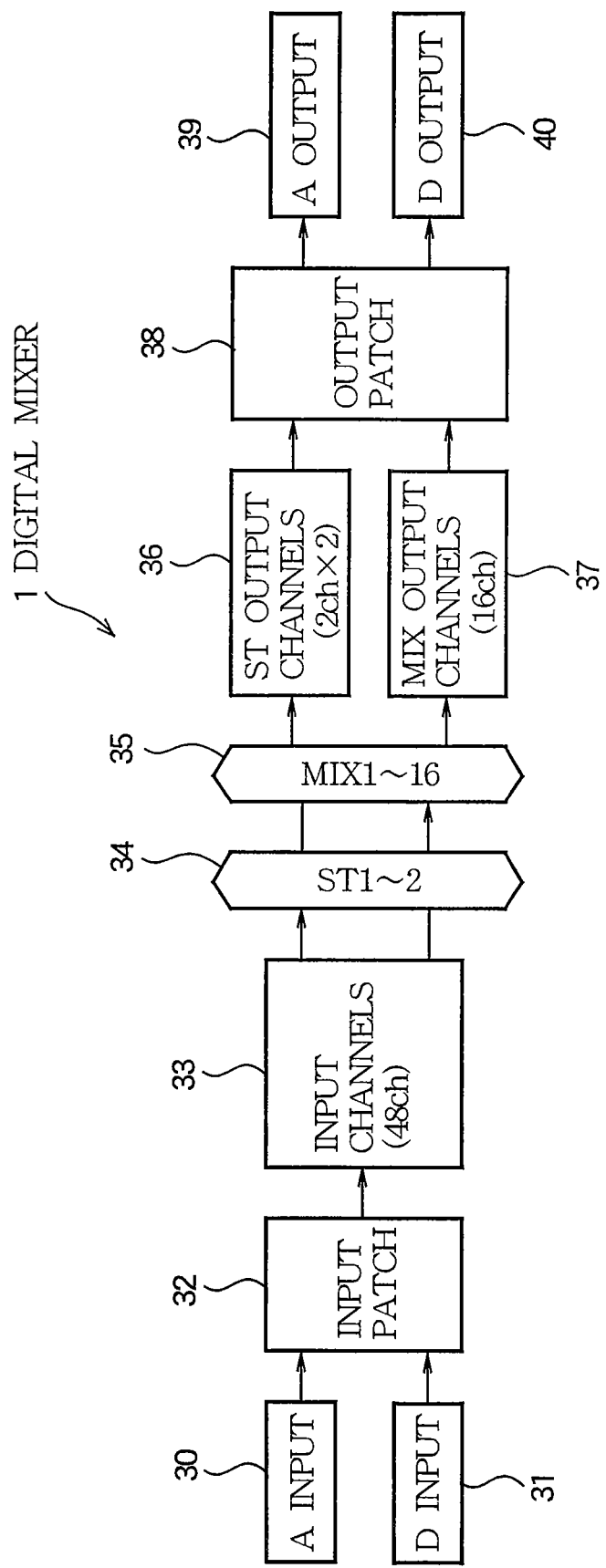
FIG. 2 is a view illustrating the configuration of an equivalent functional block in which mixing processing in the digital mixer according to the embodiment of the invention is performed.

Next, FIG. 2 shows an equivalent functional block diagram illustrating mixing processing performed in the signal processing portion 19 of the digital mixer 1 according to the embodiment of the invention, which has the configuration shown in FIG. 1, and input/output ports of the waveform I/O 18 connected to the mixing processing portion.

Referring to FIG. 2, analog signals input to a plurality of analog input ports (A inputs) 30 are converted into digital signals by an A/D converter built in the waveform I/O 18 and are then input to an input patch 32. In addition, digital signals input to the plurality of digital input ports (D inputs) 31 are input to the input patch 32 without conversion. In the input patch 32, one of the plurality of input ports that are signal input ports can be selectively patched (connected) for each input channel of a plurality of input channel portions 33 of 48 channels, for example. Accordingly, a signal from the input port patched by the input patch 32 is supplied to each input channel.

In each input channel of the input channel portion 33, an attenuator, an equalizer, a compressor or a gate, a fader, and a send adjusting portion that adjusts the level of emission to a stereo (ST) bus 34 or a mixing (MIX) bus 35 are provided. In these input channels, frequency balance or level control and the level of emission to the ST bus 34 or the MIX bus 35 are adjusted. 48-channel digital signals output from the input channel portion 33 are selectively output to two sets of ST buses 34 of ST1 to ST2 and one or more of the sixteen MIX buses 35 of MIX1 to MIX16. In the ST bus 34, one or more digital signals selectively input from arbitrary input channels of the 48 input channels are mixed in the two sets of buses. Then, a mixing output of a total of two stereo channels (2 ch×2) is output to an ST output channel portion 36. In the MIX bus 35, one or more digital signals selectively input from arbitrary input channels of the 32 input channels are mixed in the sixteen buses. Then, a mixing output of a total of sixteen channels is output to an MIX output channel portion 37. Thus, the stereo output of two channels mixed in two ways and the mixing output of sixteen channels mixed in sixteen ways can be obtained.

In each output channel of the ST output channel portion 36 and the MIX output channel portion 37, an attenuator, an equalizer, a compressor, and a fader are provided. In these output channels, frequency balance or level adjustment and a level of a signal emitted to an output patch 38 is controlled. In the output patch 38, any one channel of the 2-channel stereo signal and the 16-channel mixed signal from the ST output channel portion 36 and the MIX output channel portion 37, which are signal input ports, can be selectively patched (connected) for each output port of an analog output port portion (A output) 39 and a digital output port portion (D output) 40. Then, a signal from a channel patched by the output patch 38 is supplied to each output port.

In addition, the digital output signal supplied to the analog output port portion (A output) 39 including a plurality of analog output ports is converted into an analog output signal by a D/A converter built in the waveform I/O 18 and is then output from the analog output port. Then, the analog output signal output from the analog output port portion (A output) 39 is amplified and is then emitted from a main speaker. Moreover, the analog output signal is supplied to an in-ear monitor that a player mounts in his or her ear or is reproduced by a stage monitor speaker placed near the player. In addition, the digital audio signal output from the digital output port portion (D output) 40 including a plurality of digital output ports is supplied to a recorder, an externally connected DAT, and the like so that digital sound recording can be performed.

Figure 3:
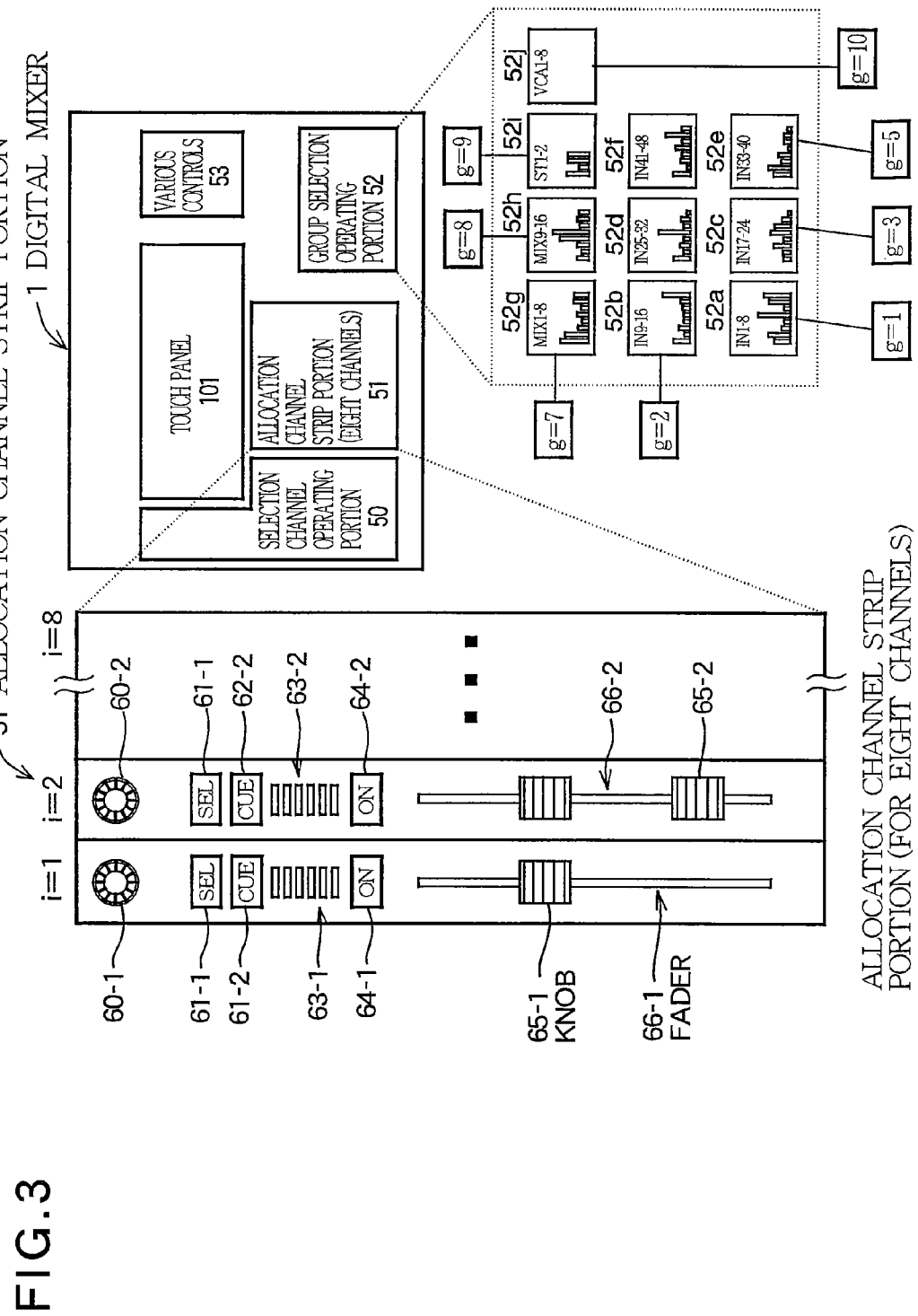
FIG. 3 is a view illustrating the schematic configuration of a panel of the digital mixer according to the embodiment of the invention and the configurations of an allocation channel strip portion and a group selection operating portion provided in the panel.

Here, FIG. 3 shows the schematic configuration of the panel of the digital mixer 1 according to the embodiment of the invention and the configurations of an allocation channel strip portion and a group selection operating portion provided on the panel.

As shown in FIG. 3, a touch panel 101 is provided on the panel of the digital mixer 1. In addition, there are provided a selection channel operating portion 50 that can change parameters of a selected channel, an allocation channel strip portion 51 configured to include eight channel strips, for example, and a group selection operating portion 52 that selects any one of channel groups of eight channels, for example, allocated to the allocation channel strip portion 51 on the panel. Moreover, other various kinds of controls 53 are also provided on the panel. There are displayed a screen of a channel strip portion in which respective channels of a selected group are assigned and another screen of a control capable of changing a parameter of a channel selected from the channels on the touch panel 101.

In FIG. 3, the detailed configuration of the allocation channel strip portion 51 is shown in an enlarged manner, and eight channel strips of i=1 to i=8 are provided. The configurations of the channel strips are the same, and the channel strip of i=1 will be described below.

An encoder 60-1 is a knob control that rotates endlessly and can change a value of an assigned parameter. An SEL key 61-1 enables changing of parameters of a channel assigned to the corresponding channel strip by the selection channel operating portion 50 when the SEL key 61-1 is operated to be turned on. A CUE key 62-1 can perform queue monitoring of a signal of a channel assigned to the corresponding channel strip when the CUE key 62-1 is operated to be turned on. A meter LED 63-1 is, for example, 6-point LED displaying the level of a channel assigned to the corresponding channel strip. An ON key 64-1 is a key for ON/OFF switching of a channel assigned to the corresponding channel strip. When the ON key 64-1 is turned off, no signal is transmitted from the corresponding channel to the MIX bus 35 or the ST bus 34. A fader 66-1 is a fader for adjusting the level of the sound volume of a channel assigned to the corresponding channel strip, and the fader 66-1 has a knob 65-1 that a user operates. Since the channel strips of i=2 to i=8 have the same configuration, and an explanation thereof will be omitted.

The group selection operating portion 52 is formed by using a touch panel, such as a liquid crystal display, and can select one group of twelve groups each of which is configured to include eight channels, for example. In the example shown in the drawing, first to tenth groups 52*a* to 52*j* set as g=1 to g=10 are displayed on the group selection operating portion 52, and a corresponding group can be selected by touching a display screen of each group. Each group is set as a group configured to include eight channels, and a group name and a level of each of the channels included in the group are displayed on a display portion of each group. Each channel of a group selected in the group selection operating portion 52 is assigned to each channel strip of the allocation channel strip portion 51, and a parameter of a channel assigned can be changed by operating a control of each channel strip. In addition, in the example shown in FIG. 3, groups of first group (g=1) to sixth group 52*f* are set as groups belonging to an input channel system, and groups of seventh group (g=7) to tenth group (g=10) are set as groups belonging to an output channel system.

The first group (g=1) 52*a* is a group including input channels 1 to 8, the second group (g=2) 52*b* is a group including input channels 9 to 16, the third group (g=3) 52*c* is a group including input channels 17 to 24, the fourth group 52*d* is a group including input channels 25 to 32, the fifth group (g=5) 52*e* is a group including input channels 33 to 40, and the sixth group 52*f* is a group including input channels 41 to 48. However, in the case when the number of input channels of the input channel portion 33 shown in FIG. 2 is set to 32 channels, the fifth and sixth groups are not provided. In addition, the seventh group (g=7) 52*g* is a group including MIX output channels 1 to 8, the eighth group (g=8) 52*h* is a group including MIX output channels 9 to 16, the ninth group (g=9) 52*i* is a group including ST output channels 1 to 2, and the tenth group (g=10) 52*j* is a group including VCA1 to 8. In addition, a further group may also be added.

Figure 6:
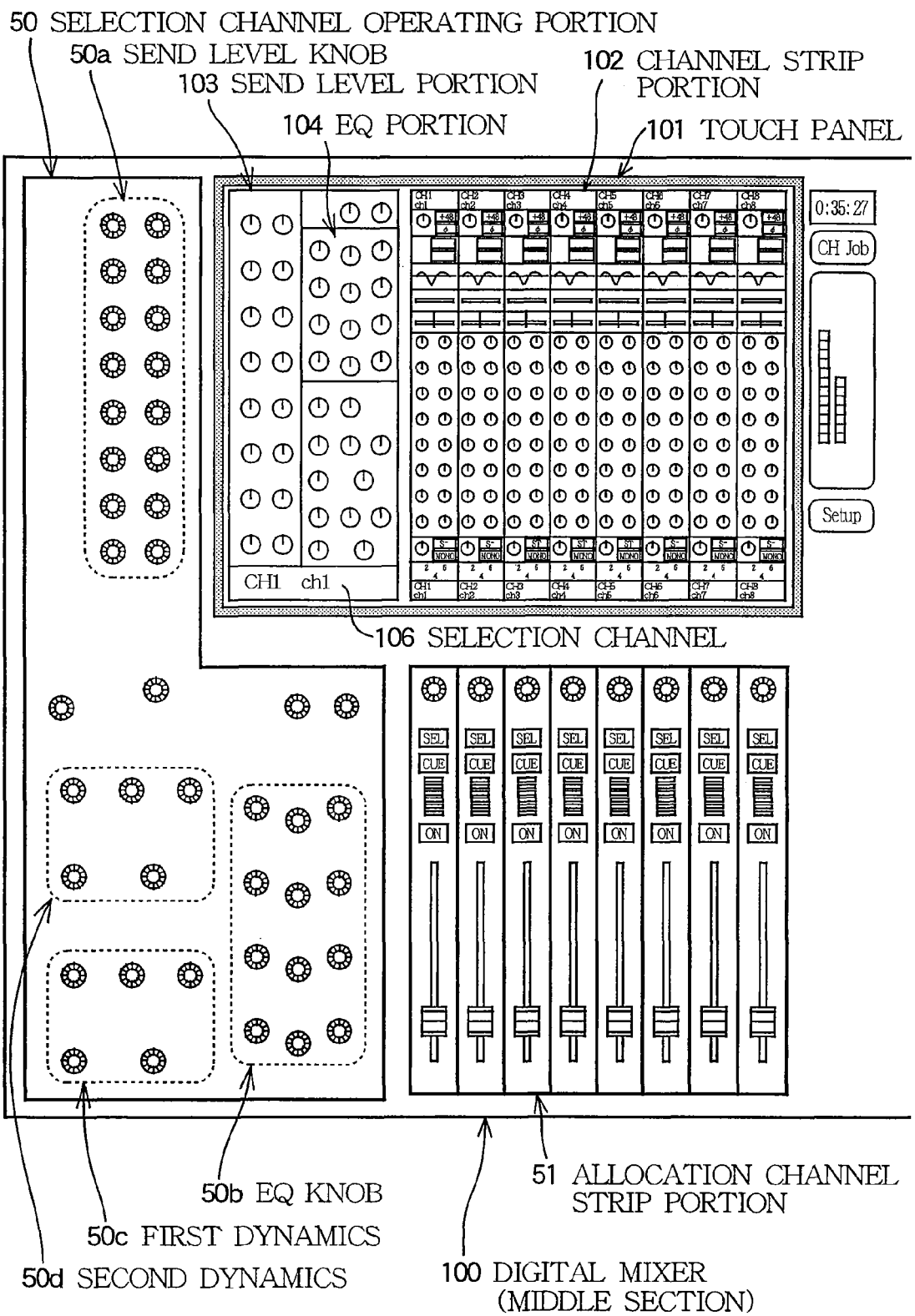
FIG. 6 is a view illustrating the configuration of a middle section of the panel of the digital mixer according to the embodiment of the invention.

Here, FIG. 6 shows the configuration of a middle section of the panel of the digital mixer 1 shown in FIG. 3. However, the configurations of the group selection operating portion 52 and various controls 53 are not shown.

In the example of the panel shown in FIG. 6, a channel strip portion 102 for eight channels and a screen of a channel operating portion positioned at the left side of the channel strip portion 102 are displayed on the touch panel 101. The allocation channel strip portion 51 for eight channels is disposed below the touch panel 101, and a screen of each channel strip of the channel strip portion 102 in which each channel strip extends is displayed adjacently and continuously with an uppermost part of each channel strip in the allocation channel strip portion 51. In this case, in each channel strip of the channel strip portion 102 displayed on the touch panel 101, a state of a parameter assigned to a corresponding channel strip in the allocation channel strip portion 51 is graphically displayed as a knob control or a switch control such that a user can select a parameter corresponding to a control by touching the graphic knob control displayed or invert an ON/OFF state of the parameter corresponding to the control by touching the graphic switch control displayed.

In the channel operating portion displayed on the left side of the touch panel 101, the state of a parameter of a channel selected by an operation of an SEL key to be described later is graphically displayed as a knob control or a switch control in channel operating portions (103, 104, 106, and others) displayed on the left side of the channel strip portion 102. Also in the channel operating portion, a user can select a parameter corresponding to a control by touching the knob control displayed or invert an ON/OFF state of the parameter corresponding to the control by touching the switch control displayed. A screen of an EQ portion 104 configured to include a total of twelve controls indicating the state of a parameter of a 4-band parametric equalizer is displayed on the channel operating portion. In the EQ portion 104, a total of twelve controls for setting the gain (G), frequency (F), and selectivity (Q) in four bands of HIGH, HIGH MID, LOW MID, and LOW, for example, are provided. In addition, the send level portion 103 configured to include a total of sixteen controls for adjusting send levels, which are transmitted from a select channel to the sixteen MIX buses 35, and a screen of the selection channel portion 106 displaying the selected channel number and the selected channel name are displayed. The channel displayed on the selection channel portion 106 is a channel assigned to a channel strip of SEL keys 61-1, 61-2, . . . operated to be turned on in the allocation channel strip portion 51.

Furthermore, in the selection channel operating portion 50, a parameter of a channel selected from eight channels assigned to the allocation channel strip portion 51 can be changed. Regarding the channel selection, a channel assigned to a channel strip of the corresponding SEL key is selected by operating any one of the SEL keys 61-1, 61-2, . . . in the allocation channel strip portion 51 to be turned on. In the selection channel operating portion 50, the parameter of the selected channel can be changed. An EQ knob 50*b* configured to include a total of twelve knob controls with switches capable of setting and changing a parameter of a four-band parametric equalizer is provided in the selection channel operating portion 50. In the EQ knob 50*b*, a total of twelve knob controls with switches for setting the gain (G), frequency (F), and selectivity (Q) in four bands of HIGH, HIGH MID, LOW MID, and LOW, for example, are provided. In addition, there are provided a send level knob 50*a* configured to include a total of sixteen knob controls with switches for adjusting the send levels transmitted from the selected channel to the sixteen MIX buses 35, a first dynamics knob 50*c* configured to include knob controls with switches for changing the parameter of first dynamics, and a second dynamics knob 50*d* configured to include knob controls with switches for changing the parameter of second dynamics. A graphic control corresponding to a physical control of each block of the selection channel operating portion 50 is graphically displayed in each block of the channel operating portion described above. For example, twelve knob controls corresponding to the send level knob 50*a* are displayed on the send level portion 103, twelve knob controls corresponding to the EQ knob 50*b* are displayed on the EQ portion 104, and twelve knob controls including knob controls corresponding to the first dynamics knob 50*c* and the second dynamics knob 50*d* are displayed on a dynamics portion (positioned below the EQ portion 104).

Thus, each knob control provided in the selection channel operating portion 50 has a switch, such that a parameter value can be changed by rotation and an ON operation can be made by pressing the switch in the axial direction. By performing the ON operation on one of the knob controls with switches, the parameter which can be changed by the knob control can be assigned to the encoders 60-1, 60-2, . . . provided in the allocation channel strip portion 51 so as to be changed. In this case, if controls and the like corresponding to parameters assigned to the encoders 60-1, 60-2, . . . are displayed in the channel strip portion 102 displayed on the touch panel 101, a cursor is automatically moved to the controls and the like in order to indicate that the parameters may be changed.

Figure 4:
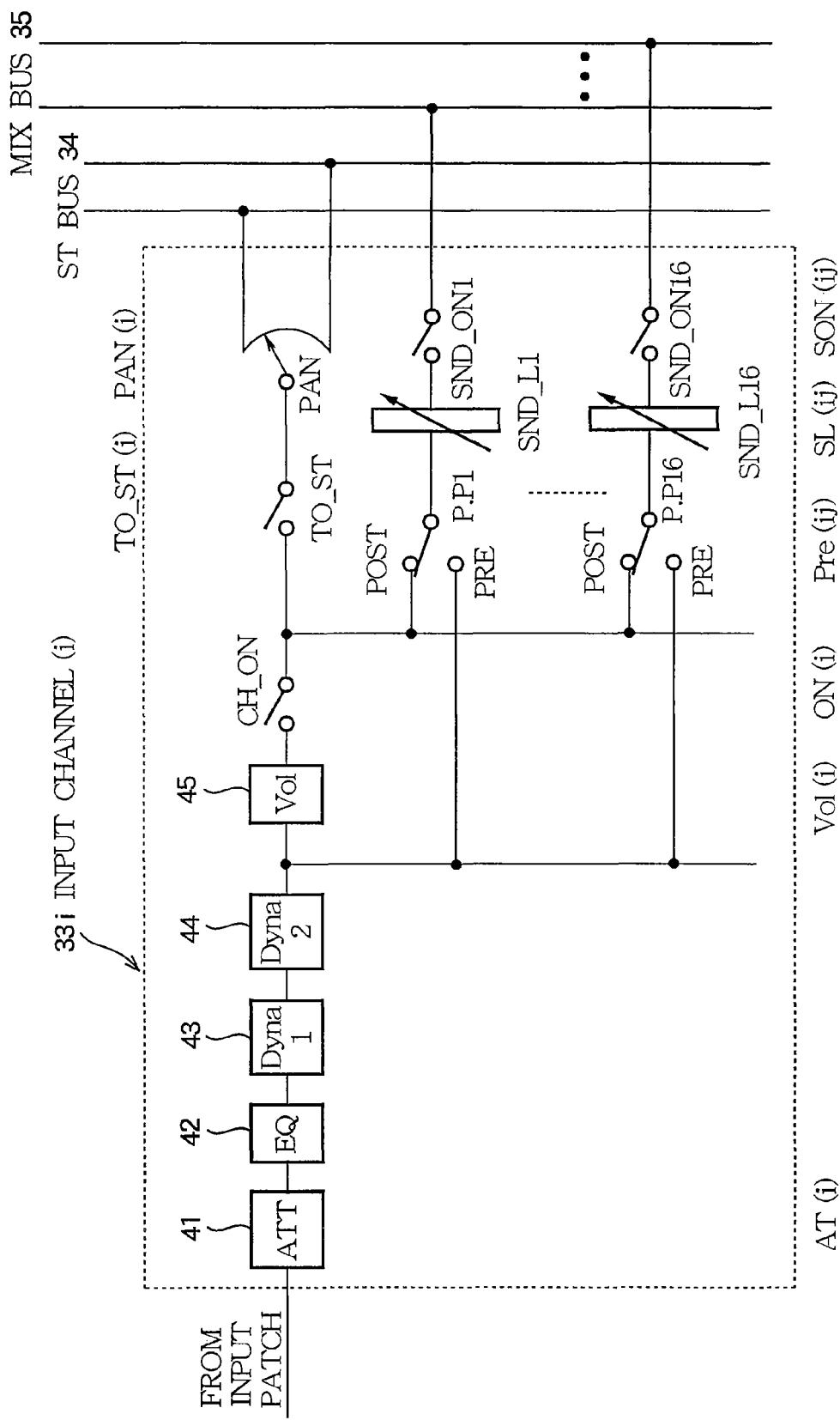
FIG. 4 is a block diagram illustrating the configuration of an i-th input channel(i) of an input channel system in the digital mixer according to the embodiment of the invention.

Next, a block diagram illustrating the configuration of an input channel 33*i* that is an i-th input channel (i) in the input channel portion 33 is shown in FIG. 4.

In the input channel 33*i*, signal processing modules of an attenuator (ATT) 41, an equalizer (EQ) 42, a first dynamics (Dyna 1) 43, a second dynamics (Dyna 2) 44, and a fader (Vol) 45 that perform different signal processing are cascade connected on a path used for transmitting an input signal to the ST bus 34. Here, the attenuator 41 is a level controller which performs processing for attenuating or amplifying the level of an input signal. In addition, the equalizer 42 is a parametric equalizer which performs processing for adjusting the frequency characteristic of an input signal and includes four bands of HIGH, HIGH MID, LOW MID, and LOW, for example.

In addition, each of the first dynamics 43 and the second dynamics 44 is a signal processing module that performs gate processing for gating a noise by rapidly decreasing an output level (gain) when an input level of a signal becomes equal to or smaller than a threshold value, compressor processing for compressing a dynamic range by reducing the output level (gain) at a fixed rate when the input level of the signal becomes equal to or larger than the threshold value, or expander processing for expanding the dynamic range by reducing the output level (gain) at a fixed rate when the input level of the signal becomes equal to or smaller than the threshold value. The fader 45 is a fader which performs processing for adjusting the input level of the input channel 33*i*. An input signal output from the fader 45 is supplied to a pan PAN through a switch CH_ON that performs ON/OFF switching of the input channel 33*i* and a switch ST_ON that turns on/off an input signal to the ST bus 34, and L and R signals in which localization of a sound image is set by the pan PAN are supplied to L and R of the ST bus 34, respectively.

In addition, sixteen paths used to supply input signals to sixteen MIX buses 35 are provided in the input channel 33*i*. In the path used to supply an input signal to the first MIX bus 35, a signal selected by a first pre/post switch P.P1 is supplied to a first send level adjustor SND_L1 and a signal whose send level is adjusted is supplied to the first MIX bus 35 through a first send switch SND_ON1 which turns on/off the input signal to the MIX bus 35. In the first pre/post switch P.P1, either a pre-fader signal (PRE) before being input to a Vol 45 or a post-fader signal (POST) having passed through the Vol 45 is selected. That is, when the first pre/post switch P.P1 is switched to the 'POST' side, the post-fader signal having passed through the Vol 45 and the switch CH_ON is output from the first pre/post switch P.P1. In addition, when the first pre/post switch P.P1 is switched to the 'PRE' side, the pre-fader signal before being input to the Vol 45 is output from the first pre/post switch P.P1.

In addition, the sixteen paths used to supply input signals to the sixteen MIX buses 35 have the same configuration. In each path for supplying an input signal to the MIX bus 35, the input signal is supplied to each of the MIX buses 35 through the same circuit configuration as the path for supplying the input signal to the first MIX bus 35.

In addition, since the input channel 33*i* is assumed to be an i-th input channel(i), it is assumed that the ATT 41 in the input channel 33*i* is expressed as AT(i), the Vol 45 is expressed as Vol(i), the switch CH_ON is expressed as ON(i), the pre/post switch P.P is expressed as Pre(i,j), the send level adjuster SND_L is expressed as SL(i,j), and the send switch SND_ON is expressed as Son(i,j). In addition, (i,j) expresses the j-th MIX bus 35 in the input channel(i).

To the ST bus 34 and the MIX bus 35, input signals having been subjected to signal processing as described above are selectively supplied to be mixed. Then, the mixed signal mixed in the ST bus 34 and the MIX bus 35 is output to the ST output channel portion 36 and the MIX output channel portion 37. In each output channel of the ST output channel portion 36 and the MIX output channel portion 37, the above-described signal processing modules, such as EQ, Dyna, and Vol, are provided and the mixed signal is subjected to signal processing by the signal processing modules. Then, output channel signals which are subjected to the signal processing and are then output from the ST output channel portion 36 and the MIX output channel portion 37 are selectively patched to be output for every output port of the analog output port portion (A output) 39 or the digital output port portion (D output) 40.

Next, examples of data of the equalizer 42 and data of the dynamics 43 and 44 are shown in FIGS. 5A and 5B. The data of the equalizer 42 shown in FIG. 5A is configured to include a center frequency (F), selectivity (Q), and a gain (G) for each of the four bands described above. Among parameters stored in the RAM 12, current values of the parameters of a selected channel may be changed by performing a rotation operation of the EQ knob 50*b* provided in the selection channel operating portion 50. In addition, when any EQ knob 50*b* is pressed in the axial direction to turn on the associated switch, a parameter assigned to the EQ knob 50*b* that is turned on is assigned to the encoder 60 of the allocation channel strip portion 51. Thereafter, a current value of the assigned parameter of the desired channel, among the parameters stored in the RAM 12, may be changed by performing a rotation operation of the encoder 60 of the channel strip to which the desired channel is assigned.

The data of the dynamics 43 and 44 shown in FIG. 5B is configured to include the type indicating one of the compressor, gate, expander, and the like, a threshold value, a rate, attack, release, and the like. Among the parameters stored in the RAM 12, parameters of the threshold value, rate, attack, release of the selected channel may be changed by performing a rotation operation of the dynamics knobs 50*c* and 50*d* provided in the selection channel operating portion 50. In addition, when the dynamics knobs 50*c* and 50*d* are pressed in the axial direction to turn on the associated switch, a parameter assigned to the knob control that is turned on is assigned to the encoder 60 of the allocation channel strip portion 51. Thereafter, a current value of the assigned parameter of the desired channel, among the parameters stored in the RAM 12, may be changed by operating the encoder 60 of the channel strip to which the desired channel is assigned.

Figure 7A:
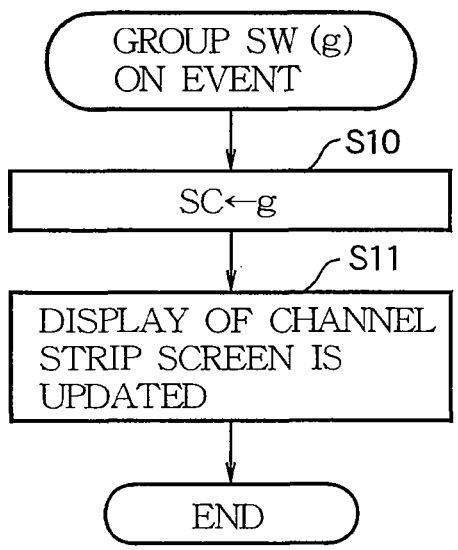
FIGS. 7A and 7B are flow charts illustrating panel related processing executed in the digital mixer according to the embodiment of the invention.
Figure 7B:
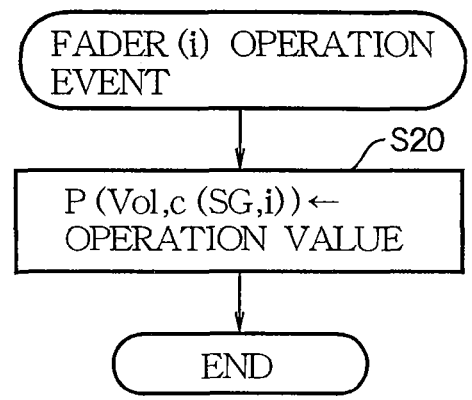

Next, a flow chart of panel related processing executed in the digital mixer 1 according to the embodiment of the invention is shown in FIGS. 7A and 7B.

FIG. 7A is a flow chart illustrating group SW(g) ON event processing. The group SW(g) ON event processing is started when any group is selected in the group selection operating portion 52, and the number of a group(g) selected in step S10 is written in the RAM 12 as a current value of a selection group SG. Then, the display screen of the touch panel 101 is updated in step S11, such that a channel strip screen corresponding to the group(g) selected in the group selection operating portion 52 is displayed. Then, the group SW(g) ON event processing is ended. The channel strip screen displayed is shown as the channel strip portion 102 in FIG. 6, for example.

In addition, FIG. 7B is a flow chart illustrating fader(i) operation event processing. The fader(i) operation event processing is started when the fader 66 of a channel strip i in the allocation channel strip portion 51 is operated, and an operation value after operation is written in the RAM 12 as a current value of a parameter P(Vol, c(SG, i)) in step S20. Then, the fader(i) operation event processing is ended. Here, the channel c(SG, i) is a channel assigned to the channel strip i of the selection group SG. In addition, the parameter P(Vol, c(SG, i)) is a parameter of the volume value Vol of a corresponding channel.

Figure 8A:
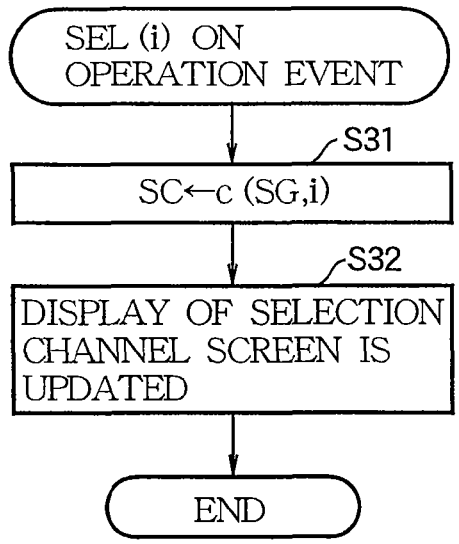
FIGS. 8A and 8B are flow charts illustrating channel strip processing executed in the digital mixer according to the embodiment of the invention.
Figure 8B:
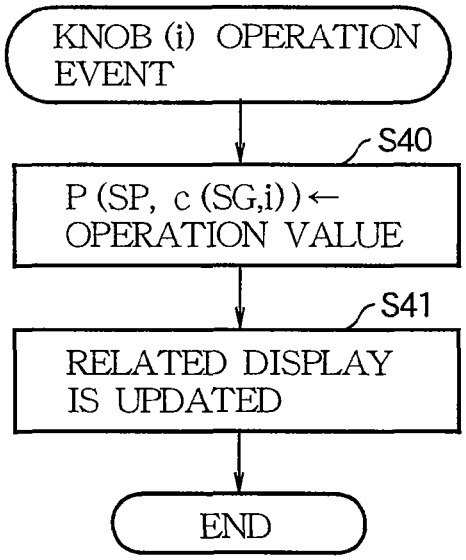

Next, a flow chart of channel strip processing executed in the digital mixer 1 according to the embodiment of the invention is shown in FIGS. 8A and 8B.

FIG. 8A is a flow chart illustrating SEL(i) ON operation event processing. The SEL(i) ON operation event processing is started when the SEL key 61 provided in the channel strip i of the allocation channel strip portion 51 is operated to be turned on, and the channel c(SG, i) is written in the RAM 12 as a current value of a selection channel SC in step S31. The channel c(SG, i) is a channel assigned to the channel strip i of the selection group SG. Then, the display screen of the touch panel 101 is updated in step S32, such that the channel number or channel name of the selection channel SC is displayed on the selection channel portion 106 of the touch panel 101. Then, the SEL(i) ON operation event processing is ended.

FIG. 8B is a flow chart illustrating knob(i) operation event processing. The knob(i) operation event processing is started when the encoder 60 provided in the channel strip i of the allocation channel strip portion 51 is operated to rotate, and an operation value of the encoder 60 is written in the RAM 12 as a current value of a parameter P(SP, c(SG, i)) in step S40. The parameter P(SP, c(SG, i)) is a parameter indicated by a selection parameter SP of a channel assigned to the channel strip i of the selection group SG, among the parameters stored in the RAM. Then, in step S41, when display regarding the parameter is performed on the touch panel, the display contents (angle of rotation of a knob and the like) are updated, and then the knob(i) operation event is ended.

Figure 9:
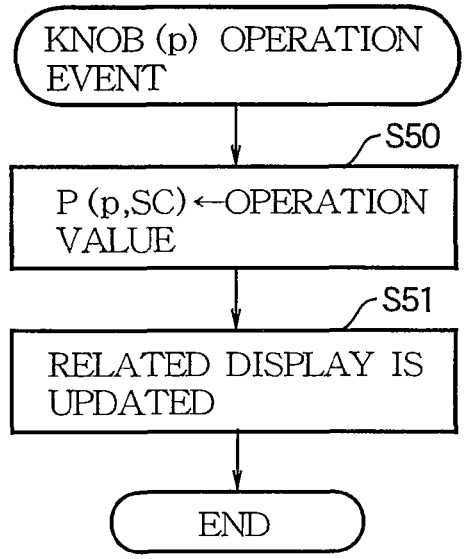
FIG. 9 is a flow chart illustrating knob(p) operation event processing executed in the digital mixer according to the embodiment of the invention.

Next, a flow chart of knob(p) operation event processing in the selection channel operating portion 50 executed in the digital mixer 1 according to the embodiment of the invention is shown in FIG. 9.

The knob(p) operation event processing is started when any knob control with a switch in the selection channel operating portion 50 is operated to rotate. Then, in step S50, an operation value of the knob control is written in the RAM 12 as a current value of a parameter P(p, SC). The parameter P (p, SC) is a parameter corresponding to a p-th knob control with switch operated to rotate in the selection channel SC selected as a result that the SEL key 61 has been operated to be turned on. Here, each knob control provided in the selection channel operating portion 50 corresponds to one of the plurality of parameters for controlling input channels and output channels, and the number p of the knob control is a number indicating a parameter of one of the input channels and output channel. Then, the display screen of the touch panel 101 is updated in step S51, such that display corresponding to the parameter P(p, SC) in the channel strip portion 102 of the displayed channel strip screen is updated. Then, the knob(p) operation event processing is ended.

Figure 10:
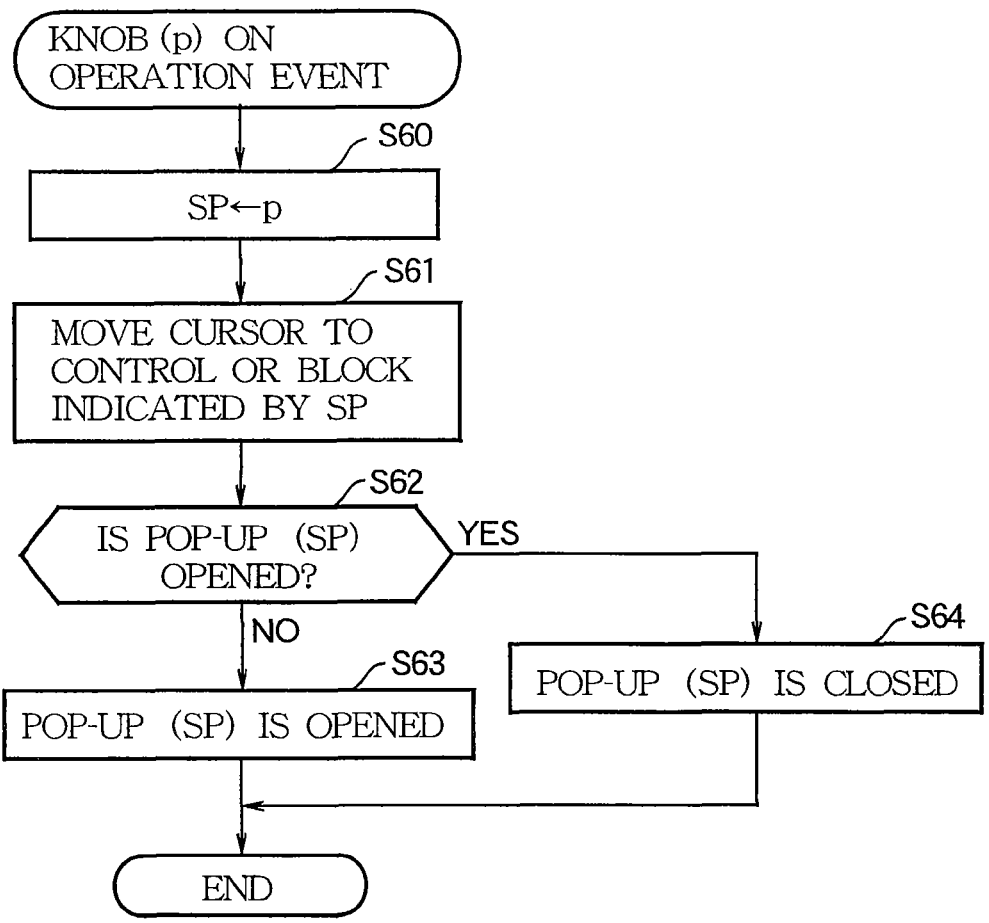
FIG. 10 is a flow chart illustrating knob(p) ON operation event processing executed in the digital mixer according to the embodiment of the invention.

Next, a flow chart of knob(p) ON operation event processing in the selection channel operating portion 50 executed in the digital mixer 1 according to the embodiment of the invention is shown in FIG. 10.

The knob(p) ON operation event processing is started when any knob control with a switch in the selection channel operating portion 50 is operated in the axial direction to be turned on the switch. Then, in step S60, the number p of the p-th knob control with a switch that is turned on is written in the RAM 12 as a current value of the selection parameter SP. That is, a parameter indicated by the number p of the knob control that is turned on is assigned to the encoder 60 of each channel strip in the allocation channel strip portion 51. In addition, the cursor in the channel strip portion 102 is moved to a knob control or block corresponding to the parameter indicated by the selection parameter SP in step S61. Subsequently, in step S62, it is determined whether or not a pop-up screen for detailed setting of the parameter indicated by the selection parameter SP is opened. Here, when it is determined that the pop-up screen of the selection parameter SP is not opened, the process proceeds to step S63 to open the pop-up screen of the selection parameter SP. In addition, when it is determined that the pop-up screen of the selection parameter SP is opened in step S62, the process branches to step S64 to close the pop-up screen of the selection parameter SP, and thus the knob(p) ON operation event processing is ended.

Figure 11:
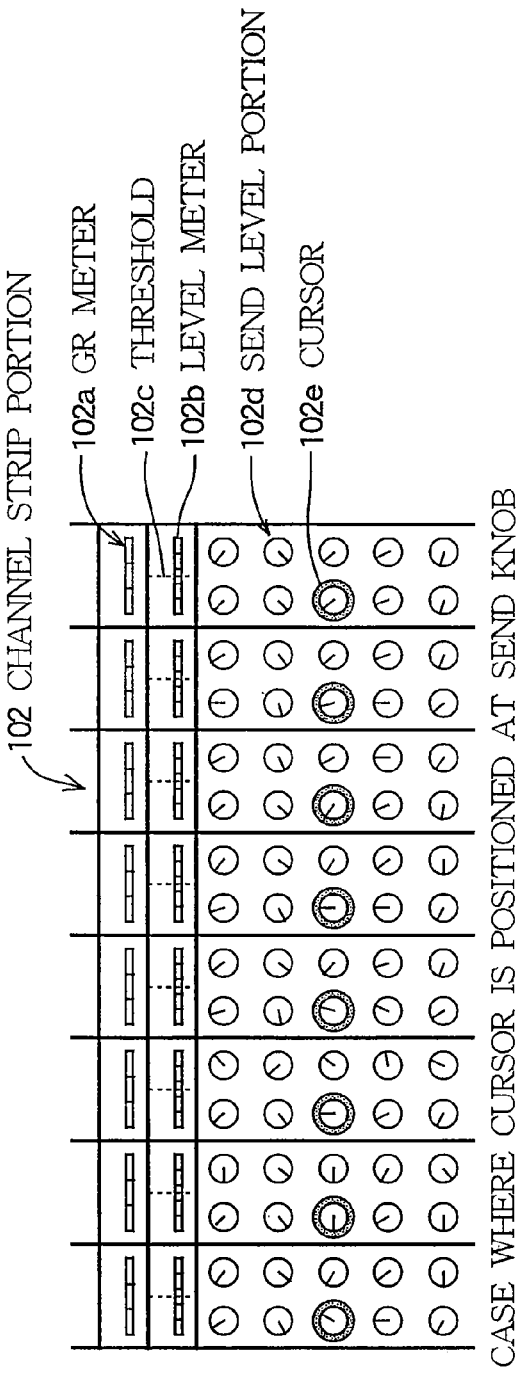
FIG. 11 is a view illustrating an example of a cursor moved in the knob(p) ON operation event processing executed in the digital mixer according to the embodiment of the invention.

FIG. 11 shows an example of a cursor moved in step S61 of the knob(p) ON operation event processing shown in FIG. 10.

FIG. 11 is an example of the case when a third send (Send 3) of the send level knob 50a with a switch in the selection channel operating portion 50 is operated to be turned on. A cursor 102e makes a movement such that the cursor 102e surrounds all controls on a horizontal row of the Send 3 of a send level portion 102d in each channel strip of the channel strip portion 102. Here, when an i-th encoder 60-i of the allocation channel strip portion 51 is operated to rotate, a send level (SND_L3) for use when transmitting to a third MIX bus a signal of a channel c(SG, i) corresponding to the channel strip i is changed among the parameters stored in the RAM 12. That is, a value indicating a third send level (SND_L3) is set in the selection parameter SP stored in the RAM 12. In addition, a display change is made such that the control of Send 3 corresponds to the changed value.

In addition, an upper display portion positioned above the send level portion 102d is set as a level meter 102b which indicates an input signal level of the second dynamics 44 with a bar graph, and a level of a threshold 102c that is currently set is also expressed as a broken line above the level meter 102b. Furthermore, a display portion positioned above the threshold 102c is set as a GR meter 102a which indicates the amount of gain reduction caused by the first dynamics 43 with a bar graph.

Figure 12:
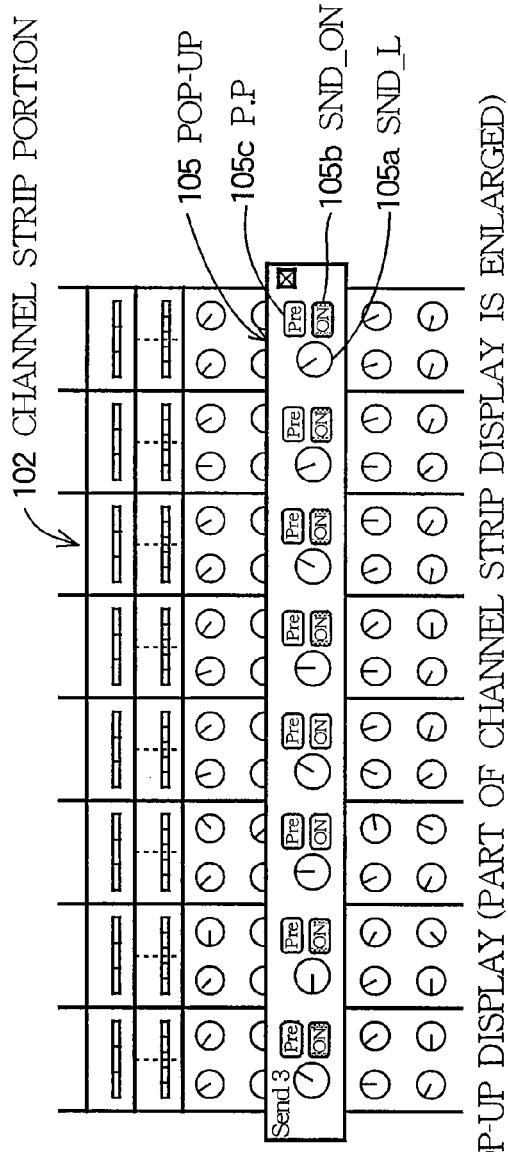
FIG. 12 is a view illustrating an example of a pop-up screen opened in the knob(p) ON operation event processing executed in the digital mixer according to the embodiment of the invention.

Next, FIG. 12 shows an example of a pop-up screen opened in step S63 of the knob(p) ON operation event processing shown in FIG. 10.

A pop-up screen 105 shown in FIG. 12 is set as a pop-up screen when the third send (Send 3) of the send level knob 50a with a switch in the selection channel operating portion 50 is operated to be turned on. A control SNR_L105a of the send level (SND_L3) for use when transmitting a signal of each input channel to the third MIX bus, a switch P.P105c of pre/post (P. P3) and a switch SND_ON105b of send ON (SND_ON3) are displayed on the pop-up screen 105 for channels displayed on the channel strip portion 102. By clicking on the display of the pre/post switch P.P105c and the send switch SND_ON105b with a pointing device, such as a mouse, on the pop-up screen 105, ON/OFF states thereof can be inverted. In addition, the pre/post switch P.P105c and the send switch SND_ON105b indicating when they are hatched, that the pre/post switch P.P105c and the send switch SND_ON105b are turned on. Using the pop-up screen 105, a parameter that is not shown in the channel strip portion 102 can also be displayed on the touch panel 101.

Next, FIG. 13 shows another example of a cursor moved in step S61 of the knob(p) ON operation event processing shown in FIG. 10.

FIG. 13 is an example when any one of the second dynamics knobs 50d with switches in the selection channel operating portion 50 is operated to be turned on, and a block of the level meter 102b in the channel strip portion 102 is bordered by the cursor 102e. In case where a control operated to be turned on is a knob control, if the encoder 60-i of the channel strip i of the allocation channel strip portion 51 is operated to rotate, a value of threshold (threshold value) of the second dynamics 44 of the channel c(SG, i) corresponding to the channel strip i is changed among the parameters stored in the RAM 12. In addition, a display change is made such that the display of the threshold 102c of the channel strip i corresponds to the changed value. In case where a control operated to be turned on is a knob control of a rate, a value of the rate of the second dynamics of the channel c(SG, i) among the parameters stored in the RAM 12 is changed in the same manner as described above. However, update of display is not performed because the rate of the second dynamics is not displayed as seen from the drawing of FIG. 13.

In the above-described embodiment of the invention, the number of channels in the input channel portion 33 is 32 channels. However, the number of channels may be set arbitrarily. In addition, a group newly set by a user may be registered in the group selection operating portion 52. In this case, a new group may be created by mounting an expansion card in the digital mixer 1.

In addition, although the example where the channel strip portion 102 and the channel operating portion are displayed on the touch panel has been described with reference to FIG. 6, an arbitrary screen may be displayed on the touch panel without being limited to the example. For example, a setup screen for performing system setup of a digital mixer, a monitor screen for performing setting of a monitor function, a scene memory screen for performing management of a scene memory, and the like may be displayed instead of the channel strip portion 102. In addition, display of the channel operating portion of the touch panel may be removed. Instead, an indicator that indicates a current value corresponding to each control of the selection channel operating portion may be provided on the panel. In addition, although a display portion in the embodiment is a touch screen (touch panel), the display portion may also be changed to a display, such as a liquid crystal, which does not have a function of detecting touch to a screen.

What is claimed is:

1. A digital mixer, having a panel, for processing audio signals through a plurality of channels and mixing the processed audio signals, the digital mixer comprising:
a display disposed on the panel;
a memory that stores parameters of each of the channels;
a channel strip section that has a plurality of channel strips, each having a fader, a channel selection button and an encoder, and that is disposed adjacent to the display;
a selected channel section that has a plurality of knob controls with switches and that is disposed on the panel;
a channel assignor that assigns the channel strips in the channel strip section to a part of the plurality of the channels;
a channel selector that, in response to an operation on the channel selection button in one of the channel strips by a user, selects the channel assigned to the one of the channel strips;
a parameter assignor that, in response to an operation on the switch of one of the knob controls in the selected channel section by the user, assigns a parameter corresponding to the knob control having the operated switch, to the encoders of the channel strips in the channel strip section;
a parameter modifier that modifies the parameters in the memory in response to operations on the panel by the user; and
an audio processor that processes and mixes the audio signals on the basis of the parameters in the memory,
wherein
in response to an operation on the fader of one of the channel strips in the channel strip section by the user, the parameter modifier modifies a sound volume parameter of a channel assigned to the one of the channel strips in the memory,
in response to a rotation operation on one of the knob controls in the selected channel section by the user, the parameter modifier modifies a parameter corresponding to the one of the knob controls, in the parameters of the channel selected by the channel selector in the memory, and
in response to a rotation operation on the encoder in one of the channel strips by the user, the parameter modifier modifies a parameter assigned by the parameter assignor, in the parameters of a channel assigned to the one of the channel strips in the memory.

2. A digital mixer, having a panel, for processing audio signals through a plurality of channels and mixing the processed audio signals, the digital mixer comprising:
a display disposed on the panel;
a memory that stores parameters of each of the channels;
a channel strip section that has a plurality of channel strips, each having a fader, a channel selection button and an encoder, and that is disposed adjacent to the display and in front of the display;
a selected channel section that has a plurality of knob controls with switches and that is disposed on the panel;
a channel assignor that assigns the channel strips in the channel strip section to a part of the plurality of the channels, and that displays a screen of channel strips having indications of the parameters, continuous with the channel strips in the channel strip section, on the display;
a channel selector that, in response to an operation on the channel selection button in one of the channel strips by a user, selects the channel assigned to the one of the channel strips;
a parameter assignor that, in response to an operation on the switch of one of the knob controls in the selected channel section by the user, assigns a parameter corresponding to the knob control having the operated switch, to the encoders of the channel strips in the channel strip section, and sets, for each of the channel strips displayed on the display, a cursor at one of the indications corresponding to the assigned parameter;
a parameter modifier that modifies the parameters in the memory in response to operations on the panel by the user; and
an audio processor that processes and mixes the audio signals on the basis of the parameters in the memory, wherein in response to an operation on the fader of one of the channel strips in the channel strip section by the user, the parameter modifier modifies a sound volume parameter of a channel assigned to the one of the channel strips in the memory, in response to a rotation operation on one of the knob controls in the selected channel section by the user, the parameter modifier modifies a parameter corresponding to the one of the knob controls, in the parameters of the channel selected by the channel selector in the memory and updates the indication of the modified parameter on the display, and in response to a rotation operation on the encoder in one of the channel strips by the user, the parameter modifier modifies a parameter assigned by the parameter assignor, in the parameters of a channel assigned to the one of the channel strips in the memory and updates the indication of the modified parameter on the display.

3. The digital mixer according to claim 2, wherein the display is a touch panel, in response to the operation on the switch of one of the knob controls provided in the selected channel section, the parameter assignor pop-ups a sub-screen, over the screen on the display, continuous with the channel strips in the channel strip section, the pop-upped sub-screen graphically presenting controls of the assigned parameter corresponding to the knob controls of the channel strips and graphic button controls of a binary parameter associated to the assigned parameter, and in response to an operation on the graphic button corresponding to one of the channel strips by the user, the parameter modifier modifies an ON/OFF state of the binary parameter of a channel assigned to the one of the channel strips.

* * * * *